United States Patent [19]

Kieronski

[11] 4,360,432
[45] Nov. 23, 1982

[54] FILTERING APPARATUS HAVING INLET VANES FOR PREVENTING ACCUMULATION OF PARTICULATES

[75] Inventor: John P. Kieronski, Charlotte, N.C.

[73] Assignee: The Terrell Machine Company, Charlotte, N.C.

[21] Appl. No.: 300,871

[22] Filed: Sep. 10, 1981

[51] Int. Cl.³ .................... B01D 33/10; B01D 46/26; B01D 46/42
[52] U.S. Cl. .................................. 210/402; 210/456; 55/344; 55/418; 55/440; 55/351; 138/39
[58] Field of Search ................. 55/128, 129, 133, 344, 55/418, 440, 351; 210/456, 402, 519; 138/37, 39

[56] References Cited

U.S. PATENT DOCUMENTS

| | | | |
|---|---|---|---|
| 2,384,414 | 9/1945 | Antrim | 55/418 |
| 3,425,189 | 2/1969 | Haselmayer | 55/129 |
| 3,831,350 | 8/1974 | Gilles et al. | 55/128 |
| 3,897,721 | 8/1975 | Fuhst | 55/418 |
| 3,926,595 | 12/1975 | Böckman | 55/418 |
| 4,226,715 | 10/1980 | Niederer | 55/418 |

FOREIGN PATENT DOCUMENTS 166135 10/1904 Fed. Rep. of Germany ........ 138/37

*Primary Examiner*—David L. Lacey
*Attorney, Agent, or Firm*—W. Thad Adams, III

[57] ABSTRACT

A filter apparatus having an inlet duct (30) with a plurality of vanes (10) therein. Each vane (10) is positioned in the fluid duct (30) and adapted for deflecting fluid as it moves through the duct (30) and further for preventing the accumulation on the vane (10) of particulate matter entrained in the fluid. Vane (10) comprises a vane body (11) defining a forward edge portion (12) which faces upstream into the moving fluid. Forward edge portion (12) has a pre-determined angle of incidence to the direction of travel of the moving fluid sufficient to overcome frictional adherence of the particulate matter. Vane body (11) also has a free end (16) spaced apart from the inner walls of duct (30). The vane body (11) also defines a rearward edge portion (13) downstream of forward edge portion (12) and defines an angle within duct (30) corresponding to the extent of deflection to be applied to the moving fluid. One of the embodiments includes alternating vane bodies (11) positioned on opposite walls of the duct (30).

17 Claims, 7 Drawing Figures

FILTERING APPARATUS HAVING INLET VANES FOR PREVENTING ACCUMULATION OF PARTICULATES

TECHNICAL FIELD AND BACKGROUND OF THE INVENTION

This invention relates to vanes of the type positioned in a moving fluid stream and used to turn and spread or contract the moving fluid. The fluid may be liquid or gaseous. The concept disclosed in this application has particular reference, for illustrative purposes, to the turning and/or spreading of a moving stream of air laden with particulate matter in order to introduce the moving stream into a filter. The vanes are constructed and positioned in the moving stream of air so that entrained particulate matter does not catch on the upstream surface of the vane.

Fluid flowing in a straight line tends to resist deflection from the path of flow. When the fluid is forceably deflected, as by passing it through a right angle turn in a duct or other enclosed structure, turbulence results. Turbulence causes noise, vibration and increased energy consumption. Therefore, it is well known in the prior art to position turning vanes in fluid ducts at a point of deflection in order to decrease turbulence. Vanes can also be used to decrease turbulence and to improve flow distribution when passing the moving fluid from a relatively small duct into a relatively large one, or vice versa. Both of these procedures are often necessary during the process of filtering particulate matter from a moving fluid stream.

For example, air filtration often takes place through a drum-type filter. A rotatable drum is covered with a fluid permeable filter medium and is positioned for rotation within a housing. Filtration takes place by passing air laden with particulate matter from the upstream to the downstream side of the drum through the filter medium. The particulate matter is trapped on the upstream side of the filter medium and forms an overlying porous layer of particulate matter which is often referred to as a "mat" or "cake". The mat then serves as an additional filter medium of enhanced filtering capacity. Recent developments have improved the efficiency of certain types of filters to the point where the underlying filter medium now serves primarily as a filter support. In order to filter large quantities of air during a given period, drum filters are many axial feet in length. However, the fluid is conveyed to the filter in ducts which may have interior dimensions only a fraction of the length of the filter drum itself. Furthermore, in order to save space, ducts often approach the filter closely adjacent the filter housing and in axial alignment with the drum. This requires that the moving air stream be turned 90° within a relatively short distance while at the same time being spread so that it enters the filter at substantially right angles along the entire length of the drum. Both of these procedures are particularly important in building a mat which is to serve as a primary filter medium, as described above. The flow of air through the filter medium must be free of turbulence which can tear sections of the mat away from the drum. Bare sections cause further unevenness in filtration and also permit particulate matter to pass through the clean filter medium which would otherwise be trapped in the overlying mat. Futhermore, in order for the mat to filter at maximum efficiency, it must be formed evenly across the entire axial length of the drum.

Accomplishing all of these tasks has been a particular problem in the past since known vanes present an upstream face which is perpendicular to the air flow and typically extend from one side of the duct to the other. Fibers and clumps of particulate matter snag on the vanes and are held there. This increases drag within the moving air stream requiring additional horsepower to move the air at its desired velocity. Other material in the air stream is trapped by the projecting clumps causing a decrease in velocity and an increase in fluid turbulence. If the clump eventually breaks loose it can enter the filter and impact the mat with such force that a portion of the mat is torn away, thereby causing an immediate decrease in filter efficiency. If the clump does not tear loose it can eventually cause a choke by blocking all or part of the duct. This can require a shutdown of the equipment while the choke is removed.

Therefore, a vane has been developed which, when positioned in a stream of moving fluid, can be used to turn and contract or spread the fluid without turbulence and without the accumulation of particulate matter on the vane.

SUMMARY OF THE INVENTION

Therefore, it is an object of the present invention to provide a self-cleaning vane for being positioned in a fluid duct and adapted for deflecting fluid as it moves through the duct.

It is another object of the present invention to provide a self-cleaning vane which prevents the accumulation on the vane of particulate matter entrained in the fluid.

It is another object of the present invention to provide a vane having a vane body defining a forward edge portion facing upstream into a moving fluid, and having a pre-determined angle of incidence to the direction of travel of the moving fluid sufficient to overcome frictional adherence of the particulate matter.

It is yet another object of the present invention to provide an apparatus which includes a plurality of self-cleaning vanes in a fluid duct adapted for deflecting fluid as it moves through the duct and further for preventing the accumulation on the plurality of vanes of particulate matter entrained in the fluid.

It is still another object of the present invention to provide a fluid filtration system including an elongate filter surface for filtering entrained particulate matter from the fluid as fluid is passed from the upstream to the downstream side thereof and a plurality of vanes positioned progressively laterally across and progressively longitudinally along an interior wall of a fluid duct for deflecting fluid onto the filter surface evenly along its entire length while preventing the accumulation of particulate matter on the vanes.

These and other objects and advantages of the present invention are achieved in the preferred embodiments described below by providing a self-cleaning vane for being positioned in a fluid duct and adapted for deflecting the fluid as it moves through the duct and further for preventing the accumulation on the vane of particulate matter entrained in the fluid. The vane preferably comprises a vane body defining a forward edge portion facing upstream into the moving fluid. The forward edge portion has a pre-determined angle of incidence to the direction of travel of the moving fluid sufficient to overcome frictional adherence of the particulate matter to the forward edge portion. The vane body also defines a rearward edge portion downstream of the forward edge portion. The vane body defines an angle within the fluid duct corresponding to the extent of deflection to be applied to the moving fluid. When used in an environment where textile fibers and the like are being filtered from a moving fluid, the angle of incidence of the forward edge portion to the direction of travel of the moving fluid may be approximately 40°. The vane body may also define a right angle curve for deflecting the fluid 90°.

Preferably, a plurality of the above-described vanes are positioned progressively laterally across and progressively longitudinally along an interior wall of the duct. A free end of the forward edge portion of the vane body is spaced apart from the inner walls of the duct in order to permit particulate matter to clear the angled forward edge portion and continue downstream.

According to one embodiment of the invention, at least one of the plurality of vanes is positioned on a first pre-determined position on the inner walls of the fluid duct and at least another of the vanes is positioned at a second pre-determined position on the inner walls of the fluid duct opposite to and laterally spaced apart from the first. This arrangement results in the free end of the forward edge portion of the vane being alternated from one vane to the next whereby fluid flow through the duct is balanced from one side to the other.

BRIEF DESCRIPTION OF THE DRAWINGS

Some of the objects of the invention have been set forth above. Other objects and advantages of the invention will appear as the description of the invention proceeds, when taken in conjunction with the following drawings, in which.

DESCRIPTION OF THE PREFERRED EMBODIMENT

Figure 2:
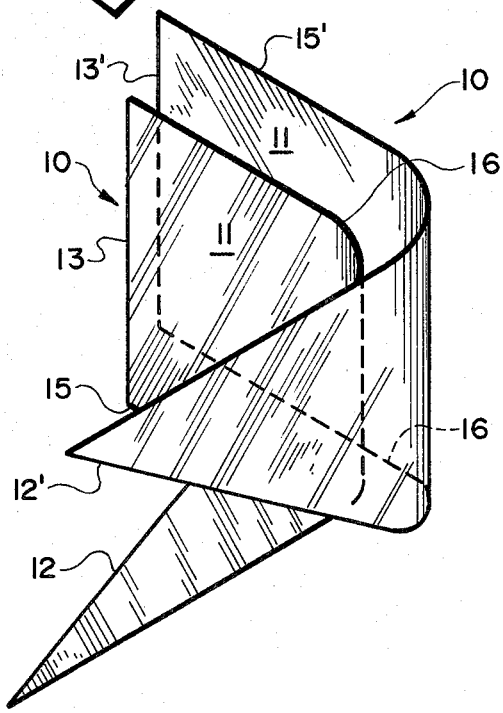
FIG. 2 is a perspective view showing schematically the alternating arrangement of one vane relative to an adjacent vane.
Figure 4:
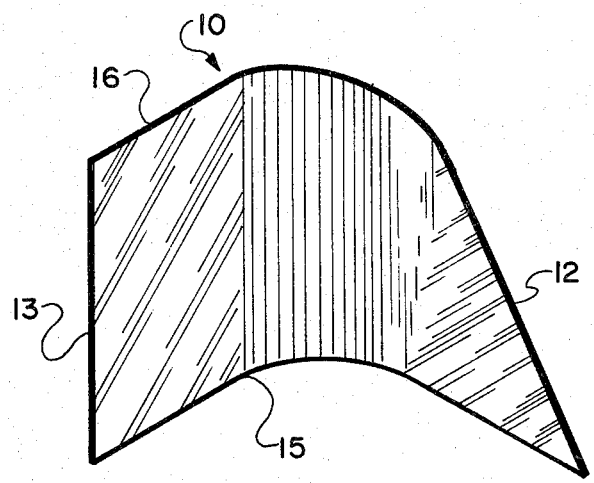
FIG. 4 is a vane according to one embodiment of the present invention.

Referring now specifically to the drawings, self-cleaning vanes according to the present invention are shown in FIGS. 2 and 4 and are indicated by broad reference 10.

Figure 1:
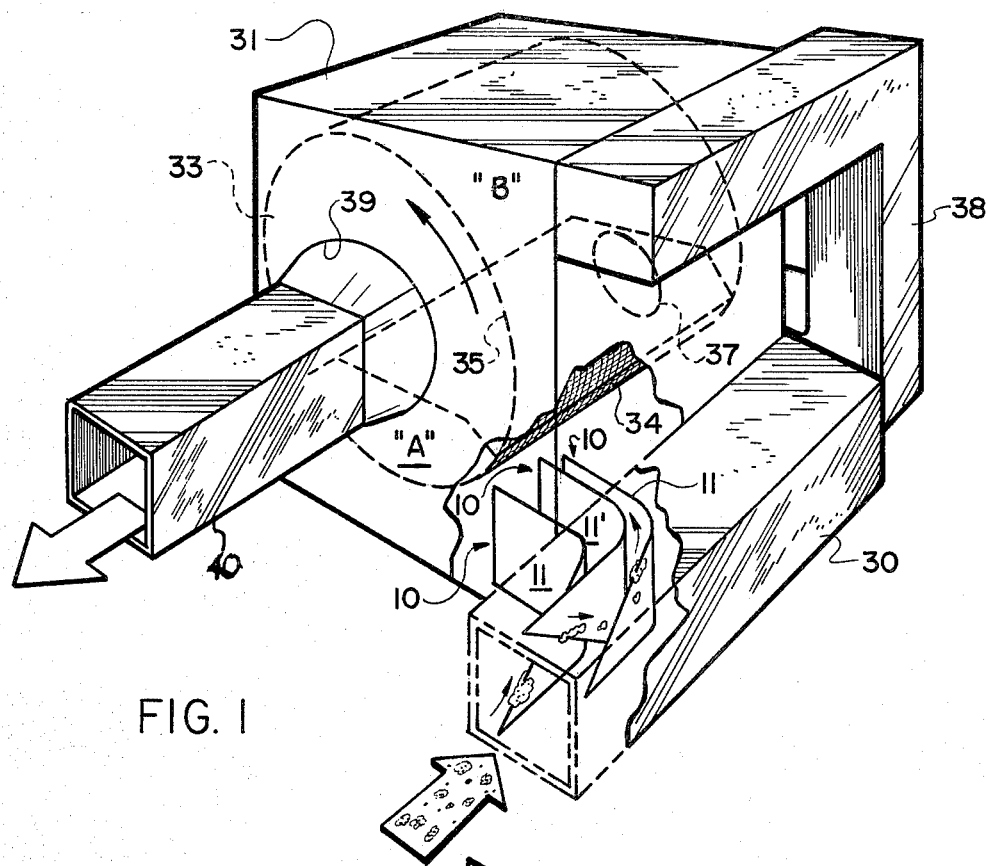
FIG. 1 is a perspective view, with parts broken away, of vanes according to the present invention in combination with a fluid filter.

Referring to FIG. 1, an air filtration system suitable for use in combination with vanes 10 is illustrated. A duct 30 delivers particulate laden air to a filter housing 31 in fluid communication therewith. A rotatably mounted drum 33 is positioned within housing 31 and is formed preferably of expanded metal and is covered with a filter medium, such as a screen 34. Part of the interior of drum 33 is sealingly enclosed on its downstream side by a metal shroud 35 and defines therein a filter chamber "A". The remainder of the interior of drum 33 defines another filter chamber "B". At least part of the particulate laden air entering housing 31 through duct 30 passes through screen 34 into filter chamber "A". The particulate matter removed from the air stream collects on the upstream surface of screen 34 and forms an overlying porous mat having an enhanced filtering capacity. Air flows out of filter chamber "A" through an outlet 37 and into a duct 38. The air re-enters housing 31 from duct 38 and this time passes through screen 34 and the overlying mat from the upstream to the downstream side of drum 33. The mat overlying the portion of the drum defining filter chamber "B" is of an optimum thickness and serves to filter any remaining contaminants from the air before the air exits housing 31 through outlet 39. The air is suitably conveyed away from housing 31 by a duct 40.

Several vanes 10 are shown positioned in duct 30 in FIG. 1. In actual use, vanes 10 would extend along duct 30 the entire length of housing 31, however, for purposes of illustration, only three are actually shown.

Figure 3:
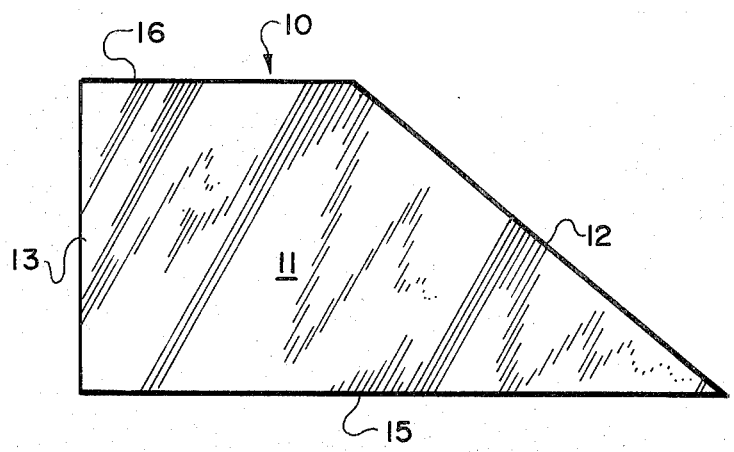
FIG. 3 is a plan view of a vane according to the present invention in a planar form.

Referring now to FIG. 4, a vane 10 according to the present invention comprises a vane body 11 having a forward edge portion 12 and a rearward end portion 13. Vane body 11 is bent so that forward edge portion 12 defines a 90° angle relative to rearward edge portion 13. Of course, vane body 11 can be bent to any desired degree in order to correspond to the extent of deflection which is to be applied to the moving air stream or left in planar form (FIG. 3) and used to spread or contract a stream passing between different sized ducts in straight line configuration. Vane body 11 is formed of a suitable guage metal and is bent to the extent desired by forming in the medial portion thereof a series of shallow-angle bends.

Forward edge portion 12 should have an angle of incidence to the direction of travel of the moving fluid sufficient to overcome frictional adherence of the particulate matter. It has been determined that 40° is a suitable angle of incidence when the particulate matter in the air comprises fibers, fiber clumps and related textile waste. It is important that forward edge portion 12 be carefully cut, trimmed and filed smooth in order to avoid the presence of irregularities which could cause the fibrous material to snag and be held on forward edge portion 12 by the moving air stream. Of course, other angles of incidence may be appropriate in given circumstances depending on the type of particulate matter entrained in the air, the size of the duct, or other variables. An angle of incidence ranging from a minimum of 30° to a maximum of 60° would appear to be suitable in the vast majority of instances.

Vane body 11 also defines a relatively long base 15 and an opposing, relatively short free end 16.

Figure 5:
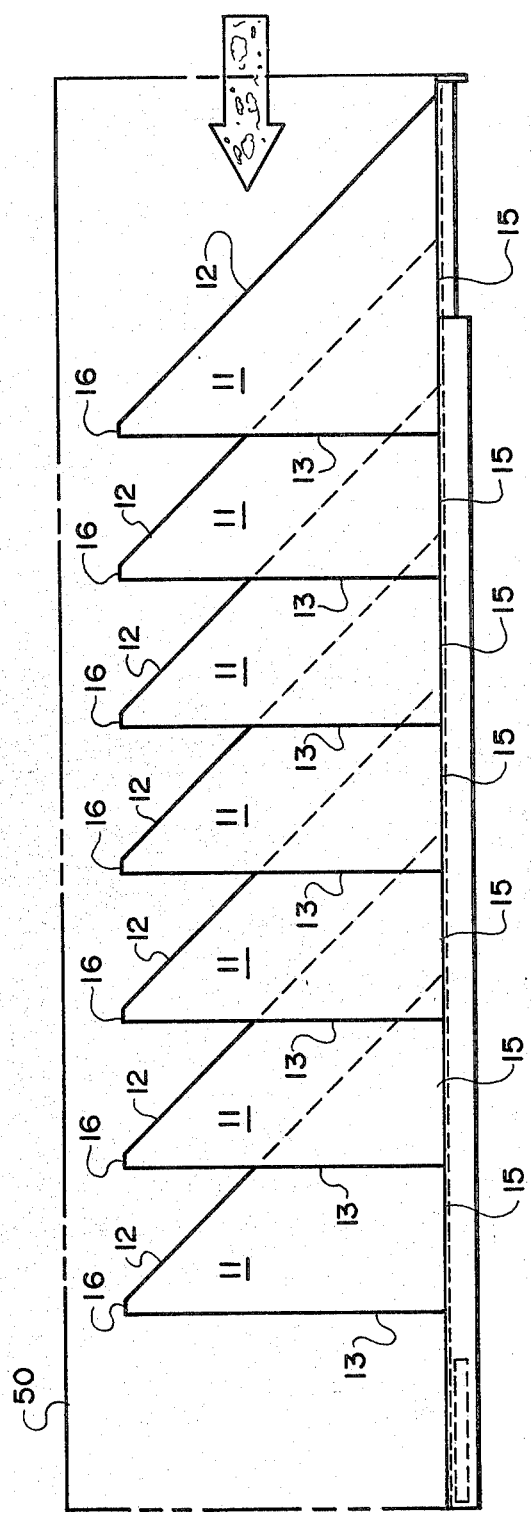
FIG. 5 is a cross-sectional view of a plurality of vanes according to one embodiment of the present invention positioned in a fluid duct.

FIG. 5 illustrates one way in which the vanes 10 may be arranged in a duct. Each vane base 15 is welded to a wall of a duct 50. By arranging the vanes laterally across and longitudinally along duct 50, the air stream is split into separate streams which are turned as the air moves upstream to downstream past vanes 10. The height of the separate vane bodies 11 is somewhat less than the interior dimensions of duct 50 into which the vanes 10 are to be placed. As is shown in FIG. 5, the free end 16 of each vane body 11 is spaced apart from the upper wall of duct 50 so that as particulate matter impacts and moves up the forward edge portion 12 it can pass over vanes 10 and continue downstream. As is apparent, air entering duct 50 adjacent its top wall will not be turned but will continue to move in a straight line in the space defined between the top wall of duct 50 and the free ends 16. Nevertheless, the arrangement illustrated in FIG. 5 is suitable where some turbulence and irregularity in the air flow can be tolerated.

Figure 6:
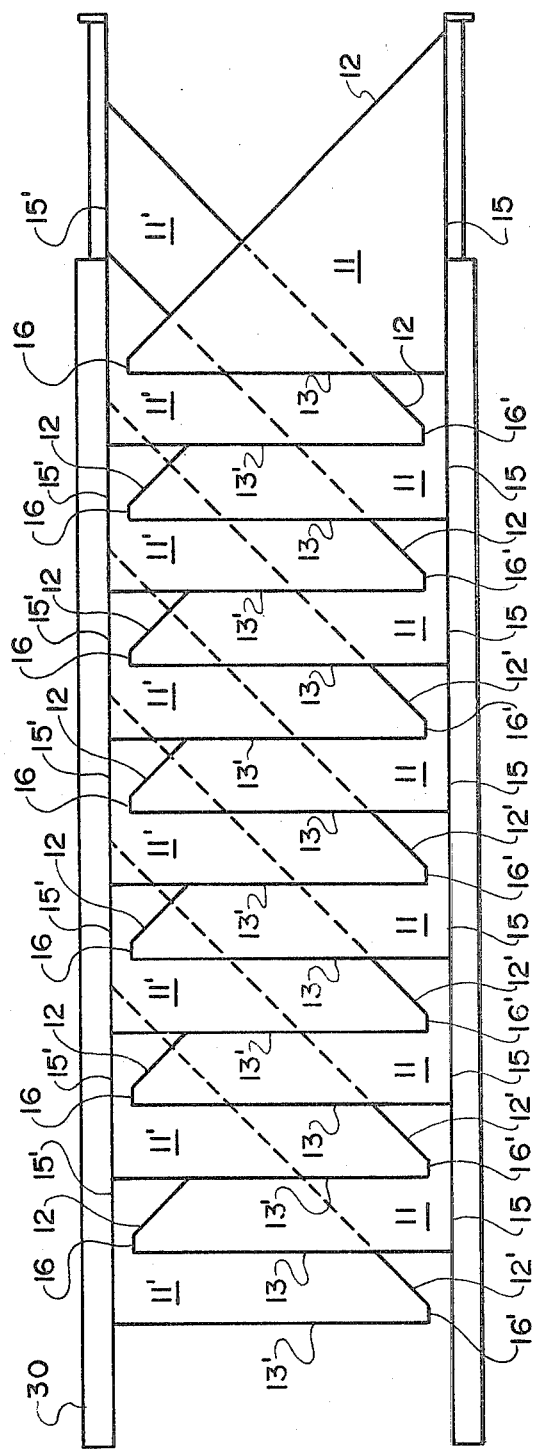
FIG. 6 is a vertical cross-sectional view of the alternating arrangement of vanes according to another embodiment of the present invention.

A preferable arrangement of the vanes 10 within a duct is illustrated in FIG. 6. Fourteen separate vane bodies (collectively 11 and 11') are shown in FIG. 6—seven welded in spaced apart relation to one interior wall of duct 30 and the other seven in alternating relation to the opposite inner wall of duct 30. Because the elements of vane bodies 11' are common to those of vane bodies 11, prime notation is used to identify their respective elements. Individual vane bodies 11 and 11' are alternately positioned on top and bottom interior walls of duct 30 by welding. This arrangement is also partially illustrated in FIG. 1. A single pair of the vanes 10 having the arrangement illustrated in FIGS. 1 and 6 is shown in perspective in FIG. 2.

The particular spacing of the vane bodies 11 depends on the extent to which the air is to be turned, the degree to which the air stream is to be contracted or expanded, and the lateral and longitudinal space within which turning, and expansion or contraction of the air must be accomplished. The free end 16 of each vane body 11 and 11' is spaced apart from the wall of the duct opposite the wall to which vane body 11 is attached. However, because of the alternating arrangement, air which is permitted to pass free end 16 of one vane body is turned by the next one. This occurs throughout the length of duct 30 and results in an extremely even and smooth distribution of air into housing 31 and through screen 34.

Figure 7:
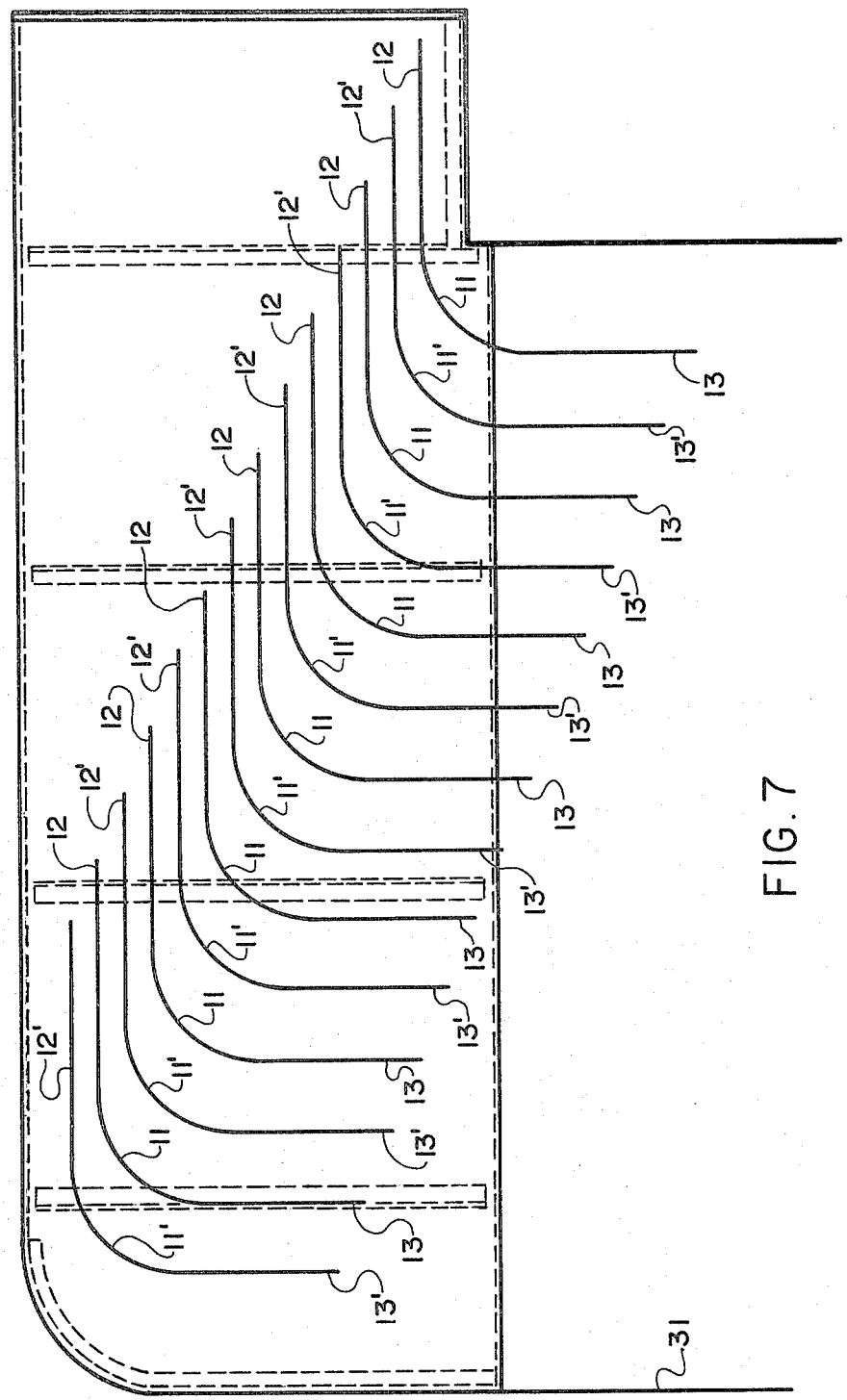
FIG. 7 is a horizontal cross-sectional view of FIG. 6.

FIG. 7 is a horizontal cross-sectional view of the arrangement shown in FIG. 6. FIG. 7 illustrates the spacing of the plurality of vane bodies 11 and 11' which permits the air to be distributed evenly along the length of filter housing 31. The distance between the individual forward edge portions 12 and 12' is less than the respective distances between rearward edge portions 13 and 13'. In the example shown in FIG. 7, the air stream is turned 90° and simultaneously spread to a width approximately 2½ times the width of the air stream immediately upstream of the first vane body 11. As is apparent, an opposite arrangement would result in an air stream being contracted in size thereby permitting air from a relatively large duct to be introduced into a relatively small duct without objectionable turbulence. When an air stream is being conveyed between ducts of equal size, the spacing between forward edge portions 12 and 12' and their respective rearward edge portions 12 and 13' will be the same. In all cases, the arrangement shown in FIGS. 6 and 7 permits an air stream to be easily turned within a relatively small space while preventing the accumulation of particulate matter on the vanes.

Self cleaning vanes which prevent the accumulation of particulate matter contained within a moving fluid stream are described above. Various details of the invention may be changed without departing from its scope. Furthermore, the foregoing description of preferred embodiments of the vanes according to the present invention is provided for the purpose of illustration and not for the purpose of limitation—the invention being defined by the claims.

I claim:

1. An apparatus comprising a fluid duct having an inlet and outlet and a vane positioned in said duct for deflecting fluid as it moves therethrough and further for preventing the accumulation on the vane of particulate matter entrained in the fluid, and comprising:
    (a) a vane body comprising a base secured to the inner wall of the duct and supporting said vane body within the duct;
    (b) said vane body also comprising a free end opposite said base for being spaced-apart from the duct walls;
    (c) said vane body further comprising a forward edge portion intermediate said base and said free end for being faced upstream toward the duct inlet, said forward edge portion having a pre-determined angle of incidence to the travel of the fluid from the duct inlet sufficient to overcome frictional adherence of particulate matter to said forward edge portion;
    (d) said vane body being constructed to define a curve corresponding to the extent of the deflection to be applied to the moving fluid;

whereby as particulate matter entrained in the fluid impacts said angled forward edge portion of said vane body, the particulate matter continues downstream along said angled forward edge portion towards the duct outlet, clearing said angled forward edge portion and being deflected to a pre-determined extent by said vane body.

2. An apparatus according to claim 1, wherein the angle of incidence of said forward edge portion to the travel of the fluid from the duct inlet is greater than 30° and less than 60°.

3. An apparatus according to claim 1, wherein said vane body is constructed to define a right angle curve for deflecting the fluid 90°.

4. An apparatus comprising a fluid duct having an inlet and outlet and a plurality of vanes positioned progressively laterally across and progressively longitudinally along an interior wall of said duct for deflecting fluid as it moves through said duct and further for preventing the accumulation thereon of particulate matter entrained in the fluid, each of said vanes comprising:
    (a) a vane body comprising a base secured to the inner wall of the duct and supporting said vane body within the duct;
    (b) said vane body also comprising a free end opposite said base for being spaced-apart from the duct walls;
    (c) said vane body fruther comprising a forward edge portion intermediate said base and said free end for being faced upstream toward the duct inlet, said forward edge portion having a pre-determined angle of incidence to the travel of the fluid from the duct inlet sufficient to overcome frictional adherence of particulate to said forward edge portion;
    (d) said vane body being constructed to define a curve corresponding to the extent of the deflection to be applied to the moving fluid;

whereby as particulate matter entrained in the fluid impacts said angled forward edge portion of said vane body, the particulate matter continues downstream along said forward edge portion towards the duct outlet, clearing said angled forward edge portion and being deflected to a pre-determined extent by said vane body.

5. An apparatus according to claim 4, wherein the angle of incidence of said forward edge portion to the direction of travel of the fluid from the duct inlet is greater than 30° and less than 60°.

6. An apparatus according to claim 5, wherein the angle of incidence of said forward edge portion to the travel of the fluid from the duct inlet is approximately 40°.

7. An apparatus according to claim 4, wherein said vane body is constructed to define a right angle curve for deflecting the fluid 90°.

8. An apparatus according to claim 4, wherein the spacing of said plurality of vanes is greater at their respective rearward edge portions than at their respective forward edge portions, whereby the moving fluid is spread and its velocity and turbulence is decreased as it moves through said duct from the inlet upstream of said plurality of vanes to the outlet downstream thereof.

9. An apparatus according to claim 4, wherein at least one of said plurality of said vanes is positioned at a first pre-determined position on the inner walls of said fluid duct, and wherein at least another of said vanes is positioned at a second pre-determined position on the inner walls of said fluid duct opposite to and laterally spaced apart from the first.

10. An apparatus according to claim 4, wherein said plurality of vanes comprises first and second groups of vanes, said first group of vanes being positioned, respectively, at pre-determined, spaced-apart positions on the inner walls of said fluid duct, and said second group of vanes being positioned, respectively, in an alternating relationship with the vanes of said first group at pre-determined positions on the inner walls of said fluid duct opposite the positions of said first group.

11. In a fluid filtration system including an elongate filter surface for filtering entrained particulate matter from a fluid as the fluid is passed from the upstream to the downstream side thereof, and a duct, having an inlet and an outlet, disposed at less than a right angle to said filter surface for conveying a fluid thereto, the combination therewith of a plurality of vanes positioned progressively laterally across and progressively longitudinally along an interior wall of the duct, each of said vanes comprising:

(a) a vane body comprising a base secured to the inner wall of the duct and supporting said vane body within the duct;

(b) said vane body also comprising a free end opposite said base for being spaced-apart from the duct walls;

(c) said vane body further comprising a forward edge portion intermediate said base and said free end for being faced upstream toward the duct inlet, said forward edge portion having a pre-determined angle of incidence to the travel of the fluid from the duct inlet sufficient to overcome frictional adherence of particulate matter to said forward edge portion;

(d) said vane body being constructed to define a curve corresponding to the extent of the deflection to be applied to the moving fluid;

whereby as particulate matter entrained in the fluid impacts said angled forward edge portion of said vane body, the particulate matter continues downstream along said angled forward edge portion towards the duct outlet clearing said angled forward edge portion and being deflected to a pre-determined extent by said vane body.

12. The combination according to claim 11, wherein the angle of incidence of said forward edge portion to the direction of travel of the fluid from the duct inlet is greater than 30° and less than 60°.

13. The combination according to claim 12, wherein the angle of incidence of said forward edge portion to the travel of the fluid from the duct inlet is approximately 40°.

14. The combination according to claim 11, wherein said vane body is constructed to define a right angle curve for deflecting said fluid 90°.

15. The combination according to claim 11, wherein the spacing of said plurality of vanes is greater at their respective rearwarde edge portions than at their respective forward edge portions, whereby the moving fluid is spread and its velocity and turbulence is decreased as it moves through said duct from the inlet upstream of said plurality of vanes to the outlet downstream thereof.

16. The combination according to claim 11, wherein said plurality of vanes comprises first and second groups of vanes, said first group of vanes being positioned, respectively, at pre-determined, spaced-apart positions on the inner walls of said fluid duct, and said second group of vanes being positioned, respectively, in an laternating relationship with the vanes of said first group at pre-determined positions on the inner walls of said fluid duct opposite the positions of said first group.

17. The combination according to claim 11, wherein said elongate filter surface comprises a rotatably mounted drum having a filter medium positioned around the circumferential periphery of said drum and wherein said plurality of vanes positioned in said duct deflects the fluid so that the fluid is passed through said filter medium at substantially right angles to the axis of rotation of said drum.

* * * * *